(12) United States Patent
Matsler (10) Patent No.: US 7,648,198 B1
(45) Date of Patent: Jan. 19, 2010

(54) ADJUSTABLE SEAT CUSHION

(76) Inventor: Winfield R. Matsler, 128 Villa Dr., Belleville, IL (US) 62223

( * ) Notice: Subject to any disclaimer, the term of this patent is extended or adjusted under 35 U.S.C. 154(b) by 0 days.

(21) Appl. No.: 12/359,552

(22) Filed: Jan. 26, 2009

(51) Int. Cl.
*B62J 1/26* (2006.01)
*A47C 31/00* (2006.01)

(52) U.S. Cl. .................. 297/200; 297/199; 297/DIG. 3; 297/219.11

(58) Field of Classification Search ................ 297/199, 297/200, 452.41, DIG. 3, 195.1, 219.11; 5/654, 655.3
See application file for complete search history.

(56) References Cited

U.S. PATENT DOCUMENTS

| | | | |
|---|---|---|---|
| 5,163,196 A | | 11/1992 | Graebe |
| 5,658,050 A | * | 8/1997 | Lorbiecki ............... 297/452.41 |
| 6,623,080 B2 | * | 9/2003 | Clapper ................. 297/452.41 |
| 6,901,617 B2 | * | 6/2005 | Sprouse et al. ................. 5/654 |
| 7,350,251 B2 | | 4/2008 | Fraser |
| 7,373,678 B2 | | 5/2008 | Hetzel |
| 2005/0121953 A1 | * | 6/2005 | Sprouse ..................... 297/199 |

* cited by examiner

*Primary Examiner*—Milton Nelson, Jr.
(74) *Attorney, Agent, or Firm*—Grace J. Fishel (57) ABSTRACT

An adjustable seat cushion for use on a support surface such as the seat of a motorcycle. The seat cushion is cellular and laterally spreadable inwardly or outwardly depending on the space between the ischial tuberosities of a user seated on the cushion for improved comfort. In an embodiment, the cellular cushion cups the buttocks and also tilts the pelvis of a user seated on the cushion forward for enhanced seated stability.

17 Claims, 7 Drawing Sheets

ADJUSTABLE SEAT CUSHION

BACKGROUND OF THE INVENTION

1. Field of the Invention

The present invention relates to a cellular cushion which is laterally spreadable inwardly or outwardly depending on the space between the ischial tuberosities of a user seated on the cushion. In addition to providing pressure-relieving comfort for the bony prominences of a sitter's pelvis, the cushion also provides enhanced seated stability.

2. Brief Description of the Prior Art

The pelvis serves as the body's center of mass. When a person moves from a standing to a seated position, the pelvis tends to rotate backwardly, causing the lumbar spine to flatten from its natural lordotic (inwardly curved) shape, resulting in increased muscle activity as the body attempts to restore balance. This results in increased fatigue and discomfort for a sitter over time. In addition, a sitter's pelvis has bony prominences such as the ischial tuberosities and coccyx. Pressure on the bony prominences, particularly the ischial tuberosities, leads to discomfort in sitting.

Providing a comfortable cushion in a vehicle is particularly a problem because of vibrational forces involved riding. Known seats for vehicles, such as motorcycles, usually have a supporting base layer, a cushion layer and an exterior cover layer. On long rides, a rider may fatigue and become saddle sore.

For comfort in sitting, a cushion should help sustain the forward tilt of the pelvis and transfer pressure from the skin tissue surrounding the bony prominences to the buttocks and thighs. A cushion should also adapt to the variable spacing between the ischial tuberosities of the two sexes (i.e., the tuberosities of females are usually more widely spaced than the tuberosities of males) and between different members of the same sex. Hence a cushion that feels good to one user may not be comfortable for another.

BRIEF SUMMARY OF THE INVENTION

In view of the above, it is an object of the present invention to provide a cellular cushion which provides relief areas for the ischial tuberosities of a user sitting on the cushion and which is adjustable to the spacing between the tuberosities. It is another object to provide a cellular cushion which tilts the pelvis of a user sitting on the cushion forward. It is also an object of the present invention to provide a cellular cushion which cups the buttocks of a user sitting on the cushion for improved stability and a feeling of being planted in the seat. Other objects and features of the invention will be part apparent and in part pointed out hereinafter.

In accordance with the invention a cellular cushion is provided for supporting a person in seated position thereon and adjusting to the distance between the person's ischial tuberosities which vary between the two sexes and between different members of the same sex.

The cellular cushion has a butterfly-shaped, planar base with a pair of rear outwardly spreading lobes, a pair of forwardly tapered lateral lobes and a pair of front lobes with a centerline axis of symmetry passing between said pairs of rear, lateral and front lobes.

The first pair of hollow cells are coupled to the rear lobes, a second pair of hollow cells are coupled to the lateral lobes and a third pair of hollow cells are coupled to the front lobes, said first, second and third pairs of hollow cells extending outwardly from the base and forming a support contour.

Each of the first pair of hollow cells in an exemplary embodiment has a flat top in which is formed a well for receiving an ischial tuberosity of a user seated on the cushion and providing a relief area for the ischial tuberosity. Each of the first pair of hollow cells further has a plurality of channels beginning near the well and extending laterally and rearwardly to a rear edge.

In the exemplary embodiment, each of the second pair of hollow cells also has a flat top and is tapered forwardly, downwardly and outwardly for receiving the inner thighs of a user seated on the cushion. The third pair of hollow cells has a flat top and is tapered rearwardly for providing a relief area for the pubis of a user seated on the cushion.

The cellular cushion is constructed such that the first pair of hollow cells are hinged on the second and third pairs of hollow cells so that said first pair of hollow cells are laterally spreadable inwardly or outwardly depending on the spacing between the ischial tuberosities of a user seated on the cushion with the ischial tuberosities received in the wells of the first pair of hollow cells.

The cellular cushion has inflation/deflation valves for the hollow cells. Separate valves are provided for each of the first pair of hollow cells. The second and third pairs of hollow cells, however, may be coupled in fluid flow communication and serviced by a third valve.

An exemplary valve for use with hollow cells includes an elongated valve stem which when folded over seals the valve. A straw may be provided for use in inflating and deflating the hollow cells and in locking the valves closed. For this purpose, elongated valve stem may be provided with tabs received in slots provided in cushion. Straw may then be used to lock the tabs in the slots and secure the valve closed.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention are illustrated, corresponding reference characters refer to corresponding parts throughout the several views of the drawings in which.

DETAILED DESCRIPTION OF THE INVENTION

Referring to the drawings more particularly by reference number, reference numeral 10 refers to an adjustable cushion in accordance with the present invention. Cushion 10 includes a planar base 12 (FIG. 4) and plurality of hollow cells 14a, 14b and 14c more particularly described below. Cushion 10 is flexible and as described herein, is configured for use with an underlying support surface, such as, but not limited to, a seat in a vehicle. Illustrative uses include, for example, a seat 16 on a motorcycle 18 (FIGS. 9-10), bicycle, ATV, utility vehicle, construction vehicle such as a backhoe, truck or the like.

Figure 4:
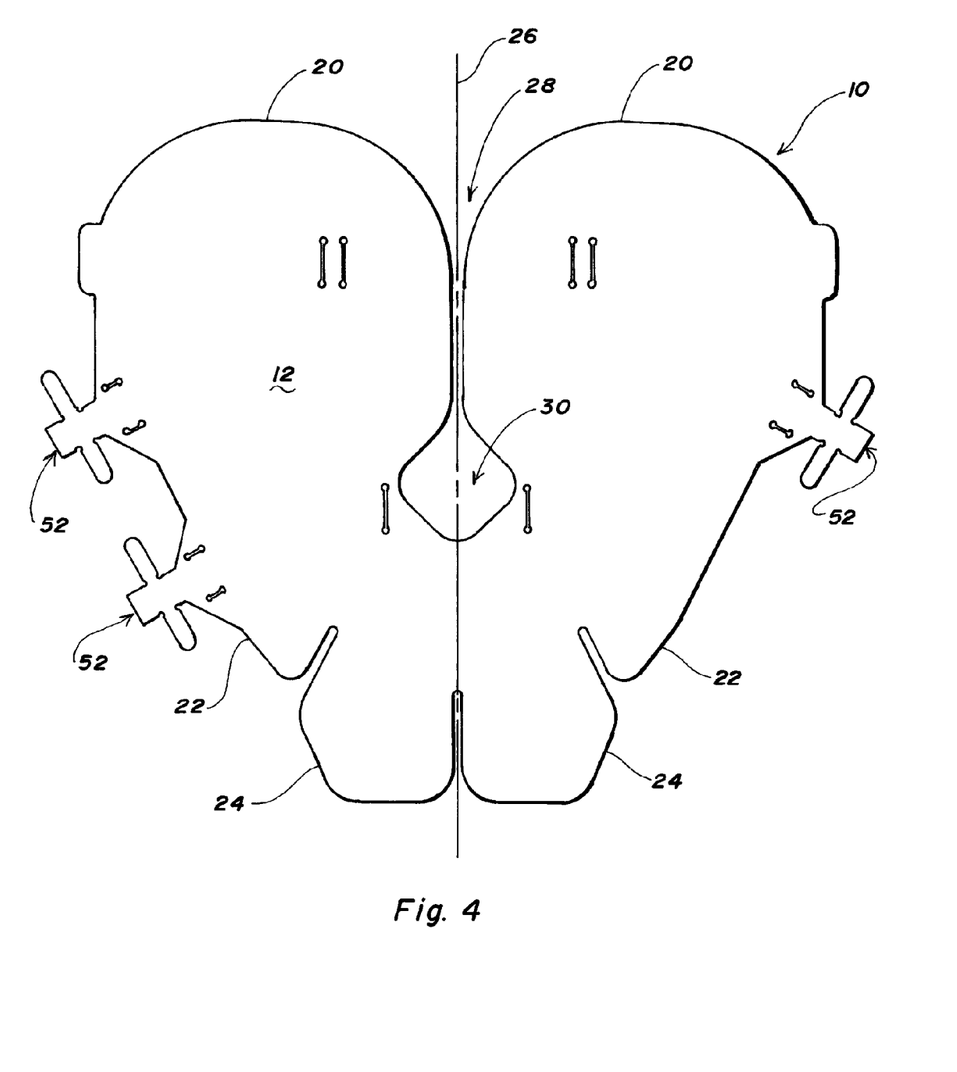
FIG. 4 is a plan bottom view of the cushion.

As seen in FIG. 4 which illustrates the underside of cushion 10, base 12 is generally butterfly-shaped. Base 12 includes a pair of rear outwardly spreading lobes 20, a pair of forwardly tapered lateral lobes 22 and a pair of front lobes 24 with a centerline axis of symmetry 26 passing between the pairs of rear, lateral and front lobes 20, 22 and 24, respectively. Rear lobes 20 are attached to lateral lobes 22 and lateral lobes 22 to front lobes 24. A slot 28 between rear lobes 20 initially narrows, then widens into a bay 30 between lateral lobes 22 and finally terminates at front lobes 24.

Figure 1:
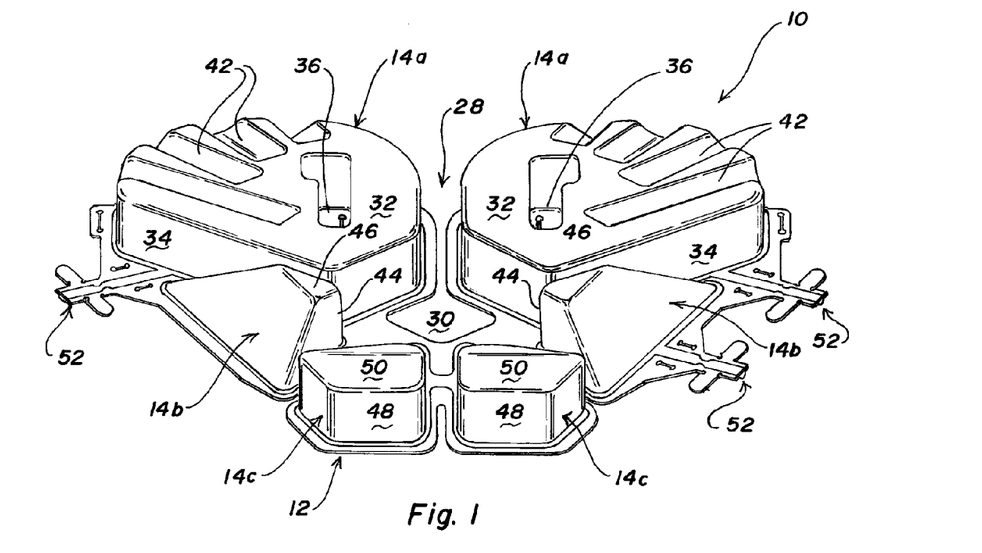
FIG. 1 is a front perspective view of an adjustable seat cushion in accordance with the present invention.
Figure 2:
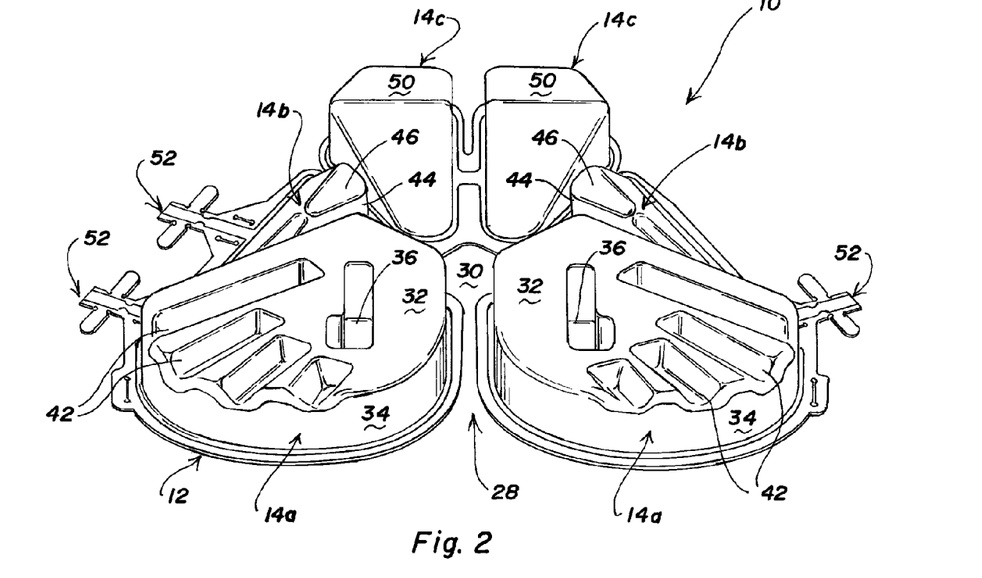
FIG. 2 is a rear perspective view of the cushion.
Figure 3:
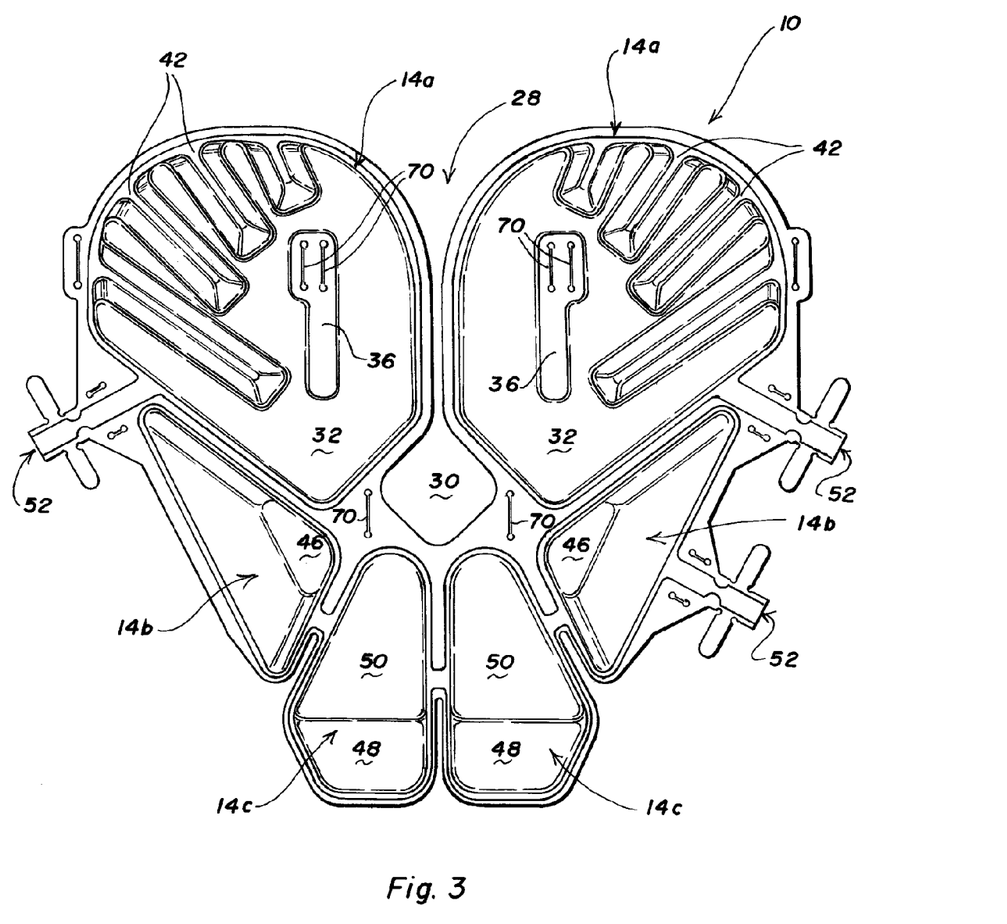
FIG. 3 is a plan top view of the cushion.

Turning to FIGS. 1-3, a first pair of hollow cells 14a are coupled to rear lobes 20 of base 12. A second pair of hollow cells 14b are coupled to lateral lobes 22 and a third pair of hollow cells 14c are coupled to front lobes 24. Hollow cells 14a, 14b and 14c extend outwardly from base 12 and form a support contour which is more particularly described below.

Figure 6:
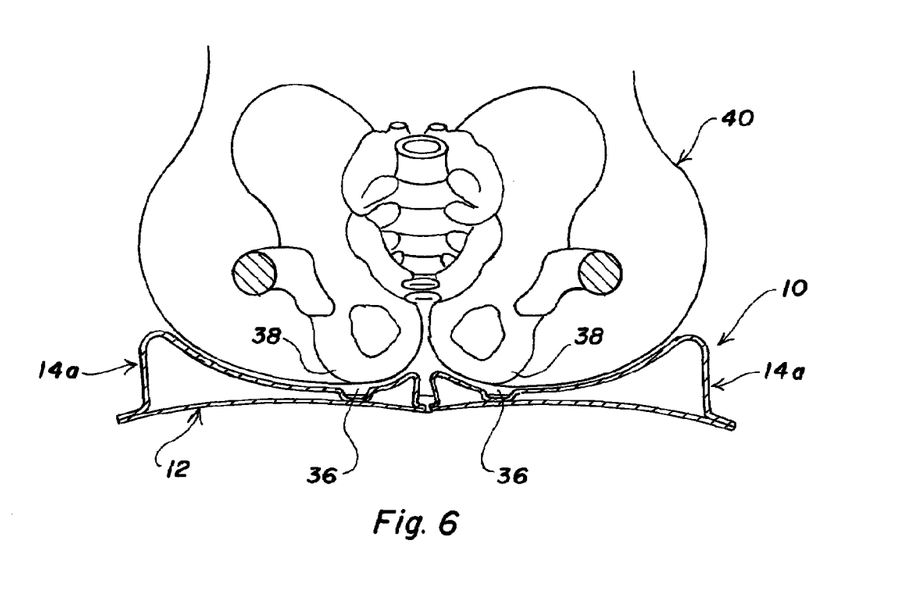
FIG. 6 is a transverse and vertical cross-section view taken substantially in the plane of the line 5-5 in FIG. 3 illustrated with a male user seated on the cushion.
Figure 7:
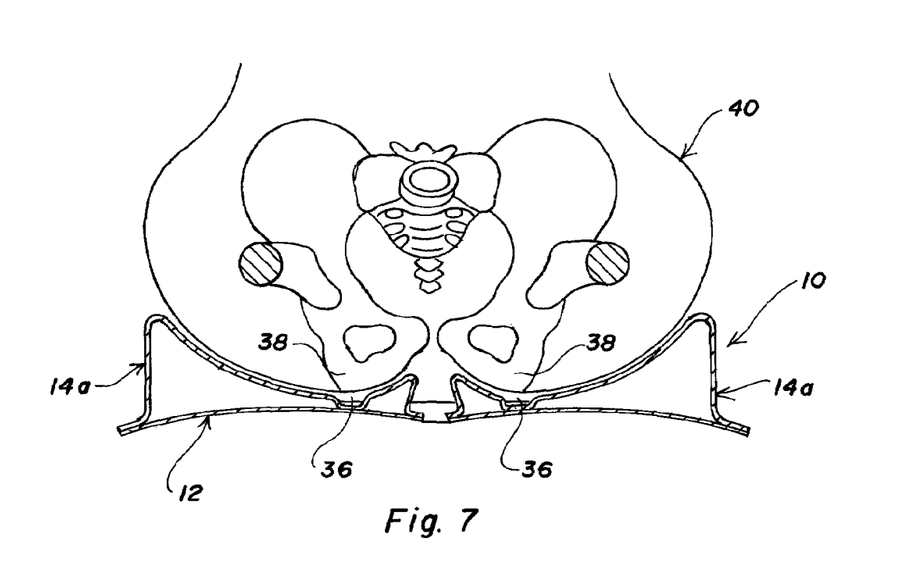
FIG. 7 is like FIG. 5 but illustrating a female user seated on the cushion.

With continuing reference to FIGS. 1-3, first pair of hollow cells 14a are generally teardrop in shape and have a substantially flat top 32 which is connected to base 12 along an escarpment 34 (FIGS. 1-2). Top 32 is substantially parallel to base 12. The spacing between hollow cells 14a at the wide end of slot 28 in base 12 provides an area of relief for the coccyx of a user seated on cushion 10. A well 36 is formed in top 32 for receipt of an ischial tuberosity 38 of a user 40 sitting on cushion 10 (FIGS. 6-7). Well 36 in each of hollow cells 14a is elongated and substantially parallel with axis of symmetry 26. A plurality of shallow channels 42 are formed in flat top 32. Channels 42 begin near each of wells 36 and extend laterally and rearwardly into escarpment 34. First pair of hollow cells 14a are sized such that flat top 32 cups around the buttocks of a user seated on cushion 10. As channels 42 inflate under the weight of the user, they become ridges thereby increasing the surface area against the user's buttocks. Inflated channels 42 extend above flat top 32 along the rear edge of cushion 10 tilting the user's pelvis forward.

Second pair of hollow cells 14b are generally triangular at base 12 and rise along bay 30 in an escarpment 44 to a substantially flat top 46 in the plane of flat top 32 of first pair of hollow cells 14a. Viewed from flat top 46, second pair of hollow cells 14b are tapered forwardly, backwardly, downwardly and outwardly for receiving the inner thighs of a user seated on the cushion.

Third pair of hollow cells 14c are generally triangular at base 10 and rise along a forward edge of cushion 10 in an escarpment 48 to a substantially flat top 50. Flat top 50 is in the plane of other flat tops 32 and 46. Viewed from flat top 50, third pair of hollow cells 14a, 14b and 14c are tapered rearwardly for providing a relief area for the pubis of a user seated on the cushion while bay 30 of base 12 provides a relief area for the genitals.

Hollow cells 14a, 14b and 14c may be coupled to base 12 by vacuum forming first and second sheets of a flexible plastic material such as urethane together. It will be understood that urethane and vacuum forming are exemplary and other plastic materials such neoprene and methods of forming such as adhesives, radio frequency (RF) welding and so forth are possible as will occur to those skilled in the plastic arts.

Figure 5A:
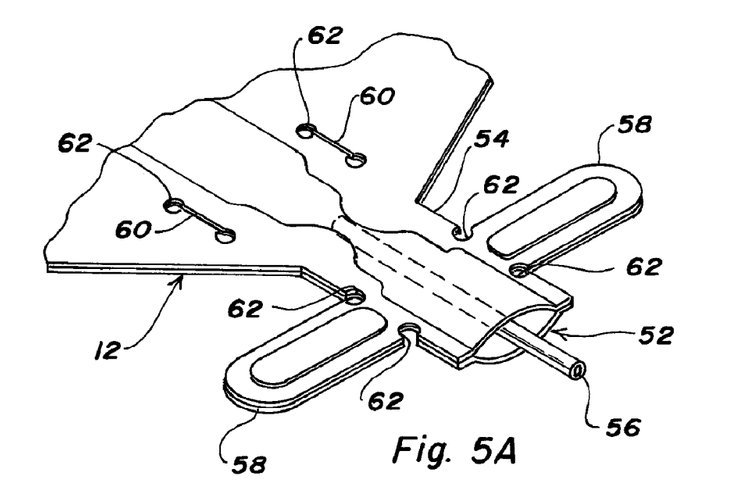
FIGS. 5A-5C show a sequence of steps in inflating a cell of the cushion through a fold-over valve and then closing the valve.
Figure 5B:
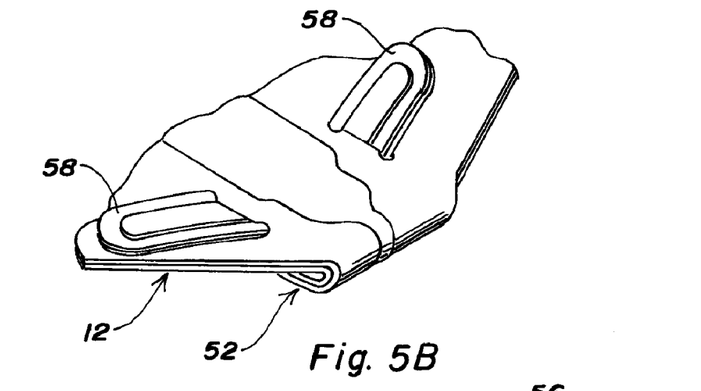
Figure 5C:
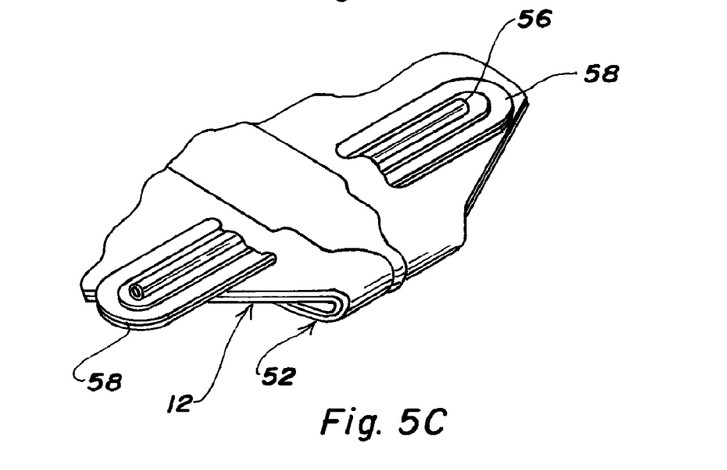

Hollow cells 14a, 14b and 14c are filled with a fluid such as air, although other gases and liquids may be used. As shown in the drawings, hollow cells 14a, 14b and 14c are not all coupled together in fluid flow communication. In the exemplary embodiment shown in the drawings, hollow cells 14a are independent regions, while other cells 14b and cells 14c are coupled together in a third region. Each region includes at least one inflation/deflation valve 52 that extends from base 12. Valves 52 may be selectively opened and closed to enable fluid to be injected into, or discharged from hollow cells 14 within the region. As shown in the drawings, with particular reference to FIGS. 5A-5C, valves 52 includes an elongated valve stem 54 integrally formed with hollow cells 14a, 14b and 14c on base 10. A straw 56 may be used to inflate or deflate hollow cells 14a, 14b and 14c (FIG. 5A). Valve stem 54 includes a pair of tabs 58 which are received in slots 60 provided in cushion 10 when valve stem 54 is folded over (FIG. 5B). Slots 60 and tabs 58 may be provided interlocking notches 62. Straw 56 may then be slid through slots 60 to secure valve 52 closed (FIG. 5C). It should be noted that other valving arrangements are possible.

Figure 8:
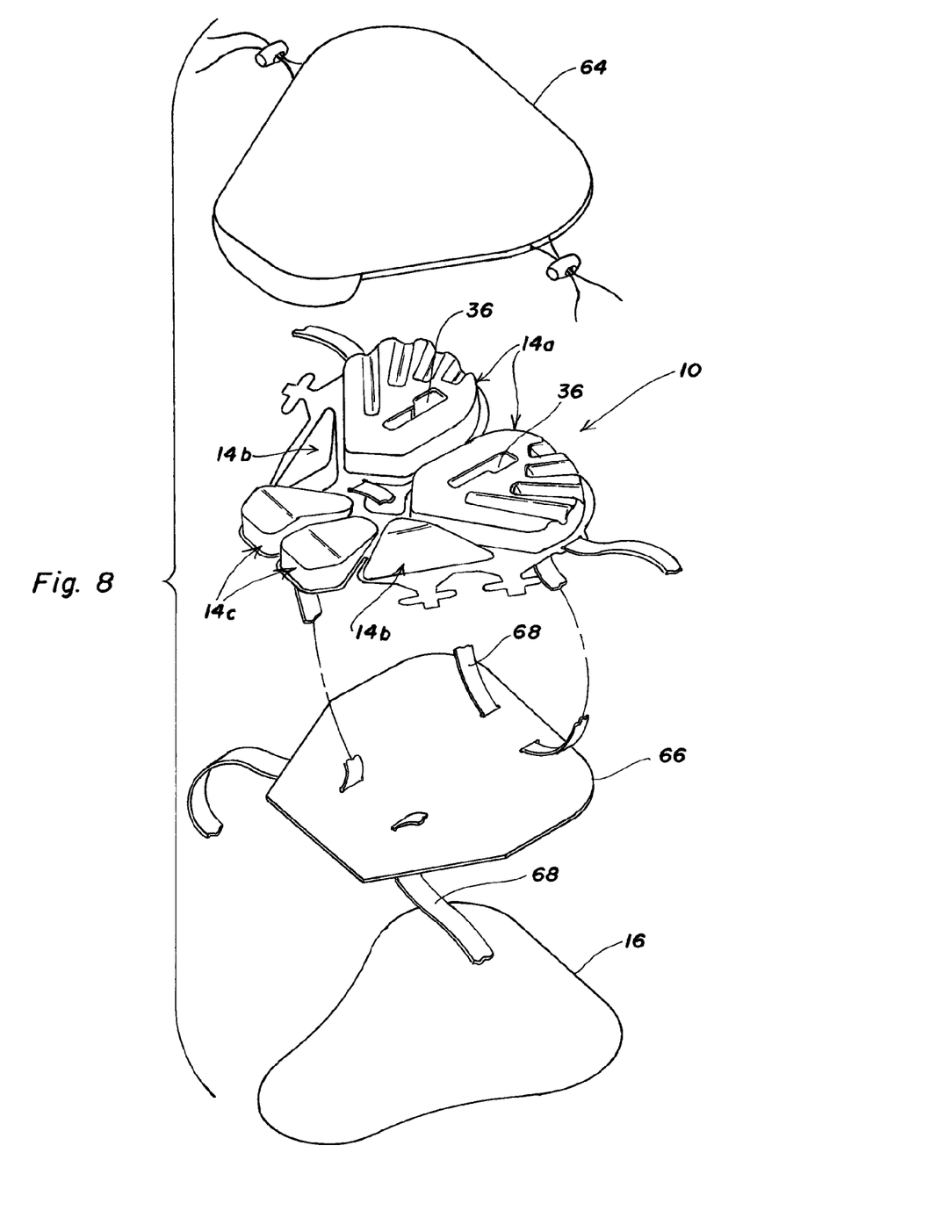
FIG. 8 is an exploded perspective view of a cover, the cushion, an attachment pad and straps and a seat.

As shown in FIG. 8, cushion 10 may be fitted with a cover 64. Cover 64 may be formed of Spandex or some other, preferably, flexible and breathable material. Cover 64 provides an aesthetically pleasing seating surface and protects hollow cells 14a, 14b and 14c. Cover 64 also may further redistribute pressure from pressure points in the ischial regions and also provides an enhanced sense of stability. Cover 64 may be attached to cushion 10 with an elastic tie, Velcro fastener or the like.

With continuing reference to FIG. 8, seat 16 provides the supporting surface for cushion 10 and a pad 66 made of a non-slip material such as used under throw rugs may be provided between seat 16 and cushion 10. A pair of straps 68 may also be provided for attachment of cushion 10 on pad 66 to seat 16. As illustrated, slots 70 (FIG. 3) provided in the bottom of wells 36 and in between hollow cells 14b. Straps 68 and pad 66 are provided to secure an alignment established between the user's ischial tuberosities 38 when first seated on cushion 10 and to prevent shifting while the vehicle is being driven.

Hollow cells 14a, 14b and 14c are preferably inflated with just enough pressure that the ischial tuberosities 38 of the user seated on the cushion do not contact seat 16. Bony, light weight, users need more air pressure in hollow cells 14a, 14b and 14c to keep ischial tuberosities 38 from bottoming in wells 36. Heavier users do not need so much. With the ischial tuberosities 38 of a user seated on the cushion 10 received in wells 36, there is more surface area of the cushion around the buttocks than would occur if cushion 10 has no wells 36. This gives the rider a noticed improvement in stability and a feeling of being planted to the seat.

Figure 9:
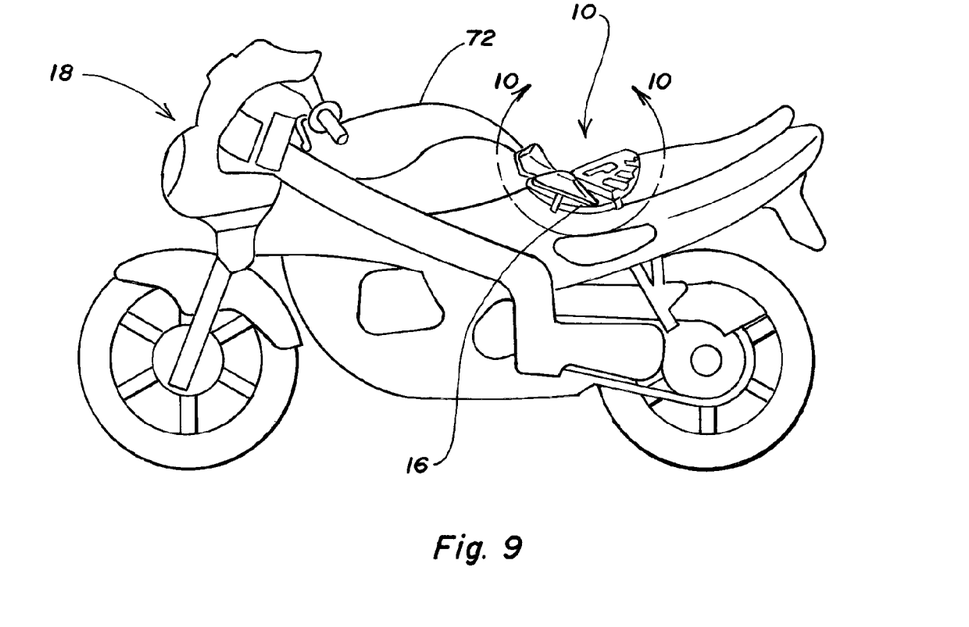
FIG. 9 is side elevation of a sport bike with the cushion shown installed on the seat and shown for purposes of clarity with the cover removed; and, FIG. 10 is a detail on an enlarged scale taken along the line 10-10 in FIG. 9.
Figure 10:
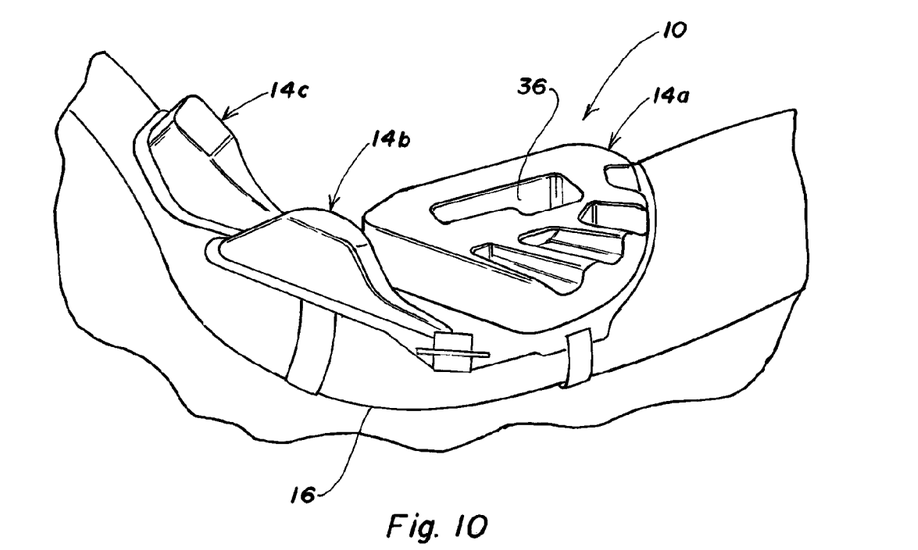

In use, as shown in FIGS. 9-10 for example on a sport bike 14 and with cover 64 omitted for purpose of clarity, cushion 10 is attached to seat 16 with hollow cells 14c extending forwardly along the motorcycle's gas tank 72. When a user first sits on cushion 10, the cushion adjusts to the spacing between the user's ischial tuberosities 38. As shown in FIG. 7, the ischial tuberosities 38 of a female user are more widely spaced than the ischial tuberosities 38 of a male user as shown in FIG. 6. There are also differences between members of the same sex. When hollow cells 14a, 14b and 14c are properly inflated and a user initially sits upon cushion 12, hollow cells 14a are laterally spread inwardly or outwardly depending on the spacing between the ischial tuberosities 38. To facilitate this adjustment, first set of hollow cells 14a are hinged at bay 30 on second and third pairs of hollow cells 14b and 14C. Once adjustment is made, straps 68 and pad 66 keep cushion 10 from shifting.

Cushion 10 cups around the user's buttocks and inflated channels 42 tilt the user's pelvis forward increasing rider comfort, stability and endurance. Slot 28 between first hollow cells 14a provides a relief area for the user's coccyx. When first pair of hollow cells 14a are properly inflated, pressure on the user's ischial tuberosities 38 is transferred to the user's thighs and buttocks for increased comfort and the user is less likely to fatigue or become saddle sore.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A cellular cushion for supporting a person in seated position thereon, the person having a pelvis with bony prominences including ischial tuberosities, coccyx and pubis and tissue masses including buttocks and inner thighs, a spacing between the ischial tuberosities of a user varying between the two sexes and between different members of the same sex, said cushion comprising:
    a butterfly-shaped, planar base with a pair of rear outwardly spreading lobes, a pair of forwardly tapered lateral lobes and a pair of front lobes with a centerline axis of symmetry passing between said pairs of rear, lateral and front lobes,
    a first pair of hollow cells coupled to the rear lobes, a second pair of hollow cells coupled to the lateral lobes and a third pair of hollow cells coupled to the front lobes, said first, second and third pairs of hollow cells extending outwardly from the base and forming a support contour,
    each of said first pair of hollow cells having a well for receiving an ischial tuberosity of a user seated on the cushion and providing a relief area for the ischial tuberosity,
    each of said second pair of hollow cells tapered for receiving the inner thighs of a user seated on the cushion;
    each of said third pair of hollow cells tapered for providing a relief area for the pubis of a user seated on the cushion;
    said first pair of hollow cells hinged on the second and third pairs of hollow cells so that said first pair of hollow cells are laterally spreadable inwardly or outwardly depending on the spacing between the ischial tuberosities of a user seated on the cushion with the ischial tuberosities received in the wells of the first pair of hollow cells.

2. The cellular cushion of claim 1 further including a slot between the first pair of hollow cells which widens into a bay between the second pair of hollow cells and terminates at the third pair of hollow cells.

3. The cellular cushion of claim 2 wherein the wells are elongated and substantially parallel to the centerline axis of symmetry.

4. The cellular cushion of claim 1 wherein first and second inflation/deflation valves are attached to the first pair of hollow cells and wherein the second and third hollow cells are coupled together in fluid flow communication and are attached to a third inflation/deflation valve.

5. The cellular cushion of claim 4 wherein each of said first, second and third valves has an elongated valve stem which when folded over seals the valve.

6. A cellular cushion for supporting a person in seated position thereon, the person having a pelvis with bony prominences including ischial tuberosities, coccyx and pubis and tissue masses including buttocks and inner thighs, a spacing between the ischial tuberosities of a user varying between the two sexes and between different members of the same sex, said cushion comprising:
    a butterfly-shaped, planar base with a pair of rear outwardly spreading lobes, a pair of forwardly tapered lateral lobes and a pair of front lobes with a centerline axis of symmetry passing between said pairs of rear, lateral and front lobes,
    a first pair of hollow cells coupled to the rear lobes, a second pair of hollow cells coupled to the lateral lobes and a third pair of hollow cells coupled to the front lobes, said first, second and third pairs of hollow cells extending outwardly from the base and forming a support contour,
    each of said first pair of hollow cells having a flat top in which is formed a well for receiving an ischial tuberosity of a user seated on the cushion and providing a relief area for the ischial tuberosity,
    each of said first pair of hollow cells further having a plurality of channels beginning near the well and extending laterally and rearwardly to a rear edge,
    each of said second pair of hollow cells having a flat top and tapered forwardly, downwardly and outwardly for receiving the inner thighs of a user seated on the cushion;
    each of said third pair of hollow cells having a flat top and tapered rearwardly for providing a relief area for the pubis of a user seated on the cushion;
    said first pair of hollow cells hinged on the second and third pairs of hollow cells so that said first pair of hollow cells are laterally spreadable inwardly or outwardly depending on the spacing between the ischial tuberosities of a user seated on the cushion with the ischial tuberosities received in the wells of the first pair of hollow cells.

7. The cellular cushion of claim 6 further including a slot between the first pair of hollow cells which widens into a bay between the second pair of hollow cells and terminates at the third pair of hollow cells.

8. The cellular cushion of claim 6 wherein the wells are elongated and substantially parallel to the centerline axis of symmetry.

9. The cellular cushion of claim 6 wherein first and second inflation/deflation valves are attached to the first pair of hollow cells and wherein the second and third hollow cells are coupled together in fluid flow communication and are attached to a third inflation/deflation valve.

10. The cellular cushion of claim 9 wherein each of said first, second and third valves has an elongated valve stem which when folded over seals the valve.

11. The cellular cushion of claim 10 wherein the valve stem further includes a pair of tabs which are latchable in slots provided in the cushion to secure the valve stem in folded over sealed condition.

12. A cellular cushion for supporting a person in seated position thereon, the person having a pelvis with bony prominences including ischial tuberosities, coccyx and pubis and tissue masses including buttocks and inner thighs, a spacing between the ischial tuberosities of a user varying between the two sexes and between different members of the same sex, said cushion comprising:
    a butterfly-shaped, planar base with a pair of rear outwardly spreading lobes, a pair of forwardly tapered lateral lobes and a pair of front lobes with a centerline axis of symmetry passing between said pairs of rear, lateral and front lobes,
    a first pair of hollow cells coupled to the rear lobes, a second pair of hollow cells coupled to the lateral lobes and a third pair of hollow cells coupled to the front lobes, said first, second and third pairs of hollow cells extending outwardly from the base and forming a support contour, each of said first pair of hollow cells having a well for receiving an ischial tuberosity of a user seated on the cushion and providing a relief area for the ischial tuberosity, each of said second pair of hollow cells tapered forwardly, downwardly and outwardly for receiving the inner thighs of a user seated on the cushion;

each of said second pair of hollow cells tapered rearwardly for providing a relief area for the pubis of a user seated on the cushion;

said first pair of hollow cells hinged on the second and third pairs of hollow cells so that said first pair of hollow cells are laterally spreadable inwardly or outwardly depending on the spacing between the ischial tuberosities of a user seated on the cushion with the ischial tuberosities received in the wells of the first pair of hollow cells, said first pair of hollow cells spaced apart a distance to provide a relief area for a coccyx of a user seated on the cushion.

13. The cellular cushion of claim 12 wherein each of the pair of first hollow cells has a rearwardly extending channel which inflates to tilt the pelvis and to provide more surface area of the cushion around the buttocks of a user seated on the cushion.

14. The cellular cushion of claim 13 mounted on a support surface with a non-slip pad between the cellular cushion and the support surface.

15. The cellular cushion of claim 14 wherein at least one strap is provided for attaching the cellular cushion and pad to the support surface.

16. The cellular cushion of claim 15 wherein the support surface is a seat on a sport bike.

17. The cellular cushion of claim 15 wherein slots are provided in a bottom of the wells and the strap is threaded through the slots for securing the position of the wells once the cushion is adjusted to receive the ischial tuberosities of a user seated on the cushion.

* * * * *